(12) United States Patent
Ramachandran

(10) Patent No.: US 8,787,447 B2
(45) Date of Patent: Jul. 22, 2014

(54) VIDEO TRANSCODING SYSTEM WITH DRASTIC SCENE CHANGE DETECTION AND METHOD FOR USE THEREWITH

(75) Inventor: Avinash Ramachandran, Toronto (CA)

(73) Assignee: VIXS Systems, Inc, Toronto, Ontario (CA)

( * ) Notice: Subject to any disclaimer, the term of this patent is extended or adjusted under 35 U.S.C. 154(b) by 894 days.

(21) Appl. No.: 12/261,218

(22) Filed: Oct. 30, 2008

(65) Prior Publication Data

US 2010/0111162 A1 May 6, 2010

(51) Int. Cl.
*H04N 7/26* (2006.01)

(52) U.S. Cl.
CPC ... *H04N 19/00163* (2013.01); *H04N 19/00921* (2013.01)
USPC ...................................... 375/240.01; 375/240

(58) Field of Classification Search
CPC .................. H04N 19/00163; H04N 19/00921
USPC ............................................. 375/240.01, 240
See application file for complete search history.

(56) References Cited

U.S. PATENT DOCUMENTS

| | | | | |
|---|---|---|---|---|
| 2001/0028743 | A1* | 10/2001 | Kostrzewski et al. | 382/232 |
| 2002/0015532 | A1* | 2/2002 | Kostrzewski et al. | 382/243 |
| 2002/0146071 | A1* | 10/2002 | Liu et al. | 375/240.16 |
| 2002/0150160 | A1* | 10/2002 | Liu et al. | 375/240.16 |
| 2002/0150162 | A1* | 10/2002 | Liu et al. | 375/240.17 |
| 2002/0176624 | A1* | 11/2002 | Kostrzewski et al. | 382/173 |
| 2003/0206228 | A1* | 11/2003 | Trevers et al. | 348/14.01 |
| 2004/0160974 | A1* | 8/2004 | Read et al. | 370/431 |
| 2004/0161034 | A1* | 8/2004 | Morozov et al. | 375/240.03 |
| 2005/0155073 | A1* | 7/2005 | Lecomte | 725/96 |
| 2005/0180512 | A1* | 8/2005 | Narasimhan et al. | 375/240.28 |
| 2005/0207495 | A1* | 9/2005 | Ramasastry et al. | 375/240.16 |
| 2005/0207664 | A1* | 9/2005 | Ramasastry et al. | 382/240 |
| 2006/0129727 | A1* | 6/2006 | Park | 710/107 |
| 2007/0074266 | A1 | 3/2007 | Raveendran et al. | |
| 2009/0323809 | A1* | 12/2009 | Raveendran | 375/240.16 |

FOREIGN PATENT DOCUMENTS

| | | |
|---|---|---|
| CN | 1531331 A | 9/2004 |
| GB | 2306833 | 5/1997 |
| JP | 2008182408 A | 8/2008 |
| JP | 2008252225 A | 10/2008 |
| WO | 0139508 A1 | 5/2001 |
| WO | 02071639 A1 | 9/2002 |

OTHER PUBLICATIONS

Yeo et al.; Rapid scene analysis on compressed video; Circuits and Systems for Video Technology, IEEE Transactions on (vol. 5 , Issue: 6 ); Dec. 1995; pp. 533-544.*

Meng et al.; CVEPS—a compressed video editing and parsing system; Proceeding MULTIMEDIA '96 Proceedings of the fourth ACM international conference on Multimedia; 1996; pp. 43-53.*

European Patent Office; European Search Report; EP Application No. 09174713.9; Apr. 15, 2014; 9 pages.

* cited by examiner

*Primary Examiner* — Bradley Holder
(74) *Attorney, Agent, or Firm* — Garlick & Markison; Bruce E. Stuckman

(57) ABSTRACT

A system for transcoding a video signal into a transcoded video signal includes a drastic scene change detection module that detects a drastic scene change in a sequence of images, wherein the drastic scene change indicates a change in scene complexity. A transcoder section generates the transcoded video signal, wherein, when the drastic scene change is detected, a quality parameter is adjusted in at least one of the sequence of images.

16 Claims, 5 Drawing Sheets

VIDEO TRANSCODING SYSTEM WITH DRASTIC SCENE CHANGE DETECTION AND METHOD FOR USE THEREWITH

CROSS REFERENCE TO RELATED PATENTS

None

TECHNICAL FIELD OF THE INVENTION

The present invention relates to video transcoding used in devices such as video processing devices.

DESCRIPTION OF RELATED ART

Video encoding has become an important issue for modern video processing devices. Robust encoding algorithms allow video signals to be transmitted with reduced bandwidth and stored in less memory. Standards have been promulgated for many encoding methods including the H.264 standard that is also referred to as MPEG-4, part 10 or Advanced Video Coding, (AVC). While standards set forth many powerful techniques, further improvements are possible in the performance and the speed of implementation of such methods. Further, the promulgation of multiple formats has led to circumstances where video signals in one format need to be transcoded in another format for use on a particular device, for transmission or for storage. The accuracy of these transcoding methods face the scrutiny of users that are becoming accustomed to higher resolution and better picture quality.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
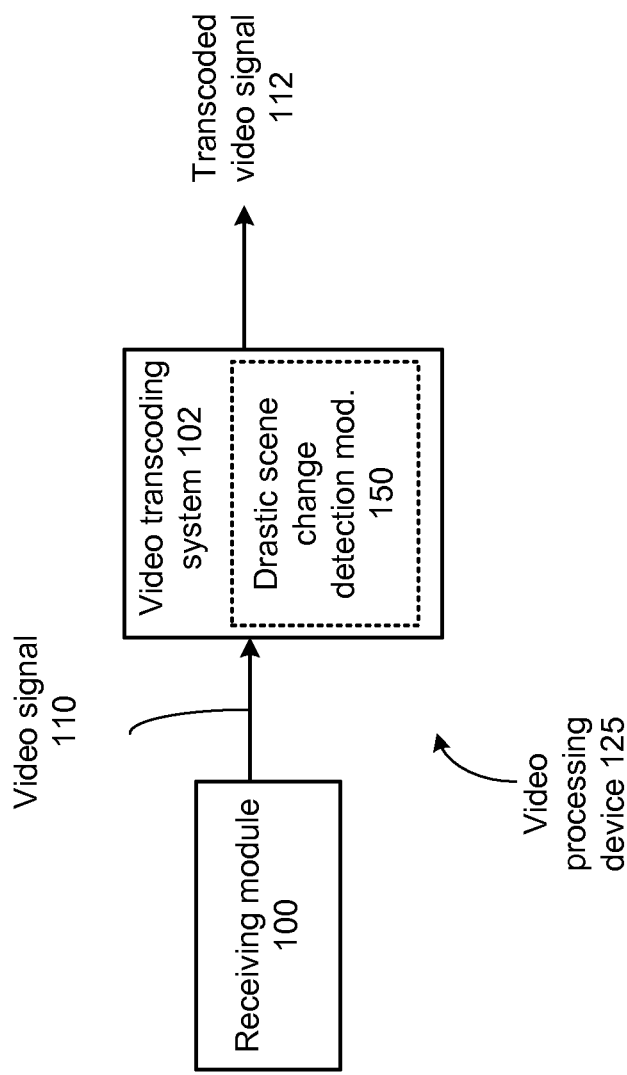
FIG. 1 presents a block diagram representation of a video processing device 125 in accordance with an embodiment of the present invention.

FIG. 1 presents a block diagram representation of a video processing device 125 in accordance with an embodiment of the present invention. In particular, video processing device 125 includes a receiving module 100, such as a set-top box, television receiver, personal computer, cable television receiver, satellite broadcast receiver, broadband modem, 3G transceiver or other information receiver or transceiver that is capable of receiving a video signal 110 from one or more sources such as a broadcast cable system, a broadcast satellite system, the Internet, a digital video disc player, a digital video recorder, or other video source. Video transcoding system 102 is coupled to the receiving module 100 to transcode the video signals 110 to form transcoded video signal 112.

In an embodiment of the present invention, the video signal 110 can include a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, the video signal 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 and transcoded video signal 112 can each be encoded in accordance with a digital video format such as H.264, MPEG-4 Part 10 Advanced Video Coding (AVC) or other digital format such as a Moving Picture Experts Group (MPEG) format (such as MPEG1, MPEG-2 or MPEG4), Quicktime format, Real Media format, Windows Media Video (WMV) or Audio Video Interleave (AVI), or another digital video format, either standard or proprietary.

The video transcoding system 102 includes a drastic scene change detection module 150 that will be described in greater detail in conjunction with many optional functions and features described in conjunction with FIGS. 2-5 that follow.

Figure 2:
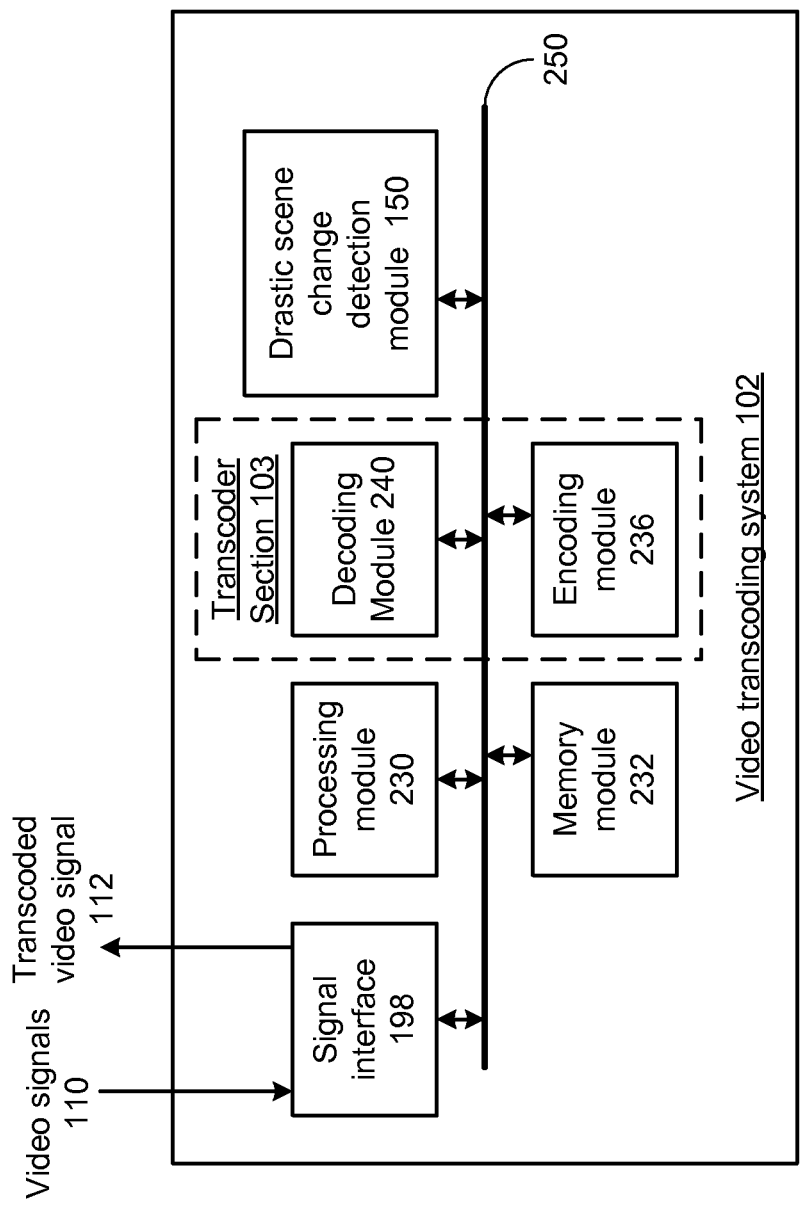
FIG. 2 presents a block diagram representation of a video transcoding system 102 in accordance with an embodiment of the present invention.
Figure 3:
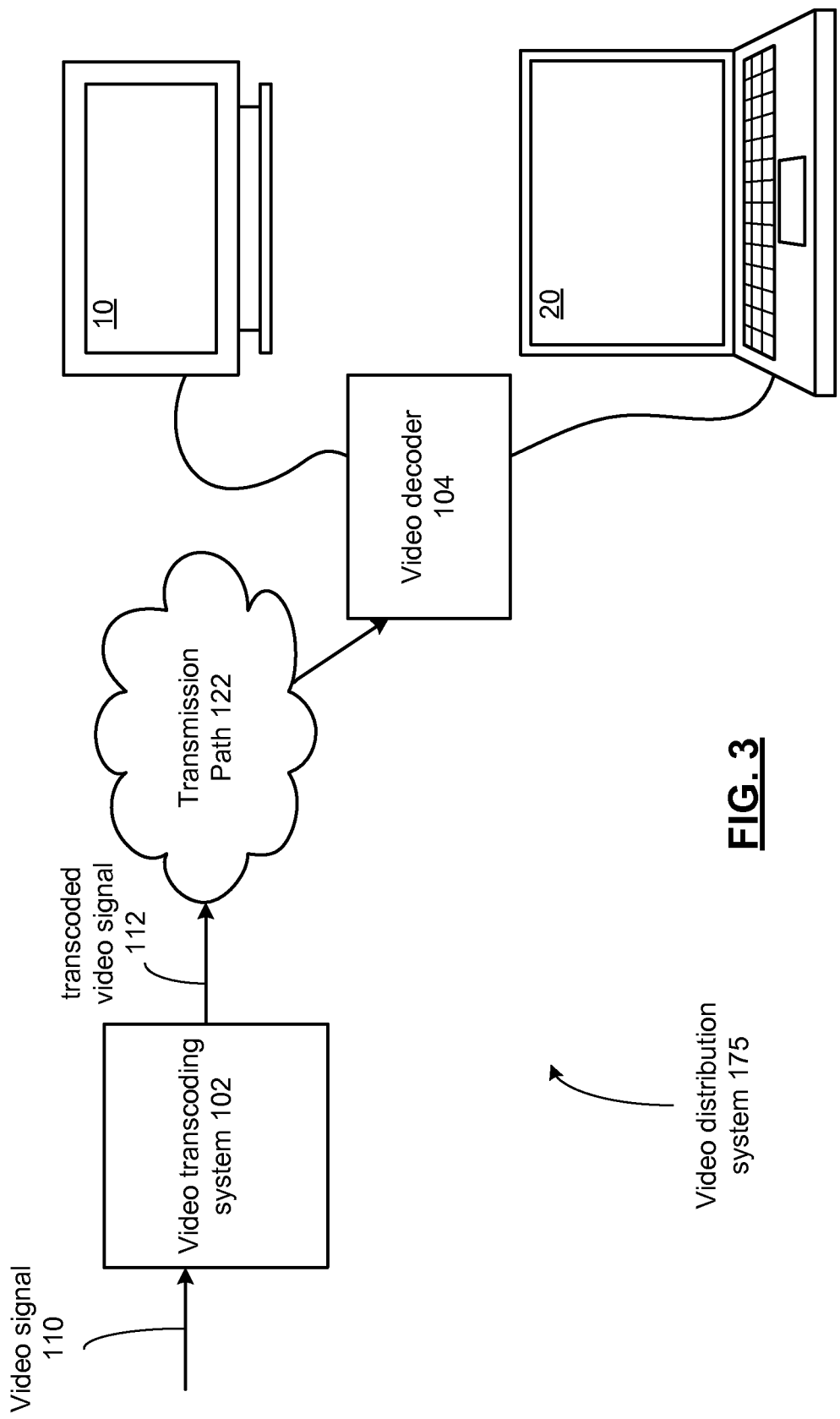
FIG. 3 presents a block diagram representation of a video distribution system 175 in accordance with an embodiment of the present invention.

FIG. 2 presents a block diagram representation of a video transcoding system 102 in accordance with an embodiment of the present invention. In particular, video transcoding system 102 operates in accordance with many of the functions and features of the H.264 standard, the MPEG-4 standard, VC-1 (SMPTE standard 421M), MPEG-2 or other standard, to transcode video input signals 110 that are received via a signal interface 198 into another digital video format and output as transcoded video signal 112.

The video transcoding system 102 includes an transcoder section 103, signal interface 198, processing module 230, and high scene cost detection module 150. The processing module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 232. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230, and memory module 232 are coupled, via bus 250, to the signal interface 198 and a plurality of other modules, such as high scene cost detection module 150, decoding module 240 and encoding module 236. The modules of video transcoding system 102 can be implemented in software, firmware or hardware, depending on the particular implementation of processing module 230. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Transcoder section 103 can operate by decoding the video signal 110 via decoding module 240 and re-encoding the decoded result via encoding module 236 to produce the transcoded video signal 112. However, decoding module 240 and encoding module 236 can alternatively cooperate to otherwise utilize parameters of the video signal 110 to transform the video signal 110 into a format of transcoded signal 112. In particular, similarities between the format of the video signal 110 and the transcoded video signal 112 can be leveraged to reduce the amount of computation required and to avoid a full decoding and re-encoding.

Drastic scene change detection module 150 detects a drastic scene change in the sequence of images, such as frames and/or fields of video signal 110. In particular, a drastic scene change is indicated based on a change in scene complexity between images in the sequence of images. Such a drastic scene change can include a change from very high complexity image to very low complexity image, a change from very low complexity image to very high complexity image, etc. In response to a drastic scene change being detected, transcoder section 103 rapidly adjusts a quality parameter for the image where the scene change was detected to compensate for the drastic scene change. This helps to avoid spillover and other visual artifacts that can otherwise be caused by such drastic scene changes.

In an embodiment of the present invention, the drastic scene change detection module 150 detects the drastic scene change based on analysis of only the I-type images (I pictures) and P-type images (P pictures) of the video signal 110. When the drastic scene change detection module 150 detects a drastic scene change in a P-type image of the video signal, the transcoder section 103 can convert the P-type image to an I-type image for encoding into the digital format of the transcoded video signal 112.

The operation of the drastic scene change detection module 150 can de described in conjunction with the following example. Consider the case where video signal 110 is a MPEG-2 formatted video signal that is being transcoded into an AVC transcoded video signal 112. Drastic scene change detection module 150 can use encoding parameters such as picture level statistics from the video signal 110, in this case MPEG-2 based statistics, to determine a change in scene complexity.

For example, scene complexity can be characterized based on the number of bits used in an image, b; variance values, var, for some or all of the macroblocks of the image; and quantization step values (QP). A scene complexity for the ith image, $C_i$, can be determined by combining these parameters effectively in the form of a function, $f$:

$$C_i = f(b, var, QP)$$

A weighted linear function of these three parameters can be employed, with weighting coefficients chosen to normalize the particular parameters or otherwise generated based on experimental results. Alternatively, a nonlinear function can likewise be employed.

In addition, drastic scene change detection module 150 can determine an average scene complexity, C, over a plurality of images in the sequence of images. For instance, the average scene complexity can be determined as follows:

$$C = \Sigma(C_i)_{i=(n-k) \text{ to } (n-1)}$$

In this fashion, the average scene complexity can be determined based on a moving average of the previous k images. A change in scene complexity can be determined based on a difference, such as an absolute difference, between the average scene complexity for as described above and the scene complexity for the current scene $C_n$. While a uniform moving average is shown above, an exponentially weighted moving average, other weighted average or other average can likewise be employed. The drastic scene change detection module 150 can detect a drastic scene change by comparing the change in scene complexity to a scene complexity threshold. In particular, the drastic scene change detection module 150 can detect a drastic scene when the change in scene complexity compares unfavorably to the scene complexity threshold, ST, such as when:

$$|C - C_n| > SCT$$

The scene complexity threshold can be determined experimentally based on the analysis of actual scenes of differing complexities including drastic transitions in scene complexity that would cause spillover or other undesirable artifacts without the benefits of the present invention.

Once a drastic scene change is detected that corresponds to a particular image, as discussed, the quality can be rapidly adjusted to compensate. In an embodiment of the present invention, the transcoder section 103 adjusts the values of QP to compensate for the drastic scene change. For example, the QP can be raised for changes from a low complexity image to a high complexity image. Likewise, the QP can be lowered for changes from a high complexity image to a low complexity image. While the forgoing description has focused on scene complexity changes from low-to high and high-to-low, a greater number of different changes with finer gradations may likewise implemented.

Figure 4:
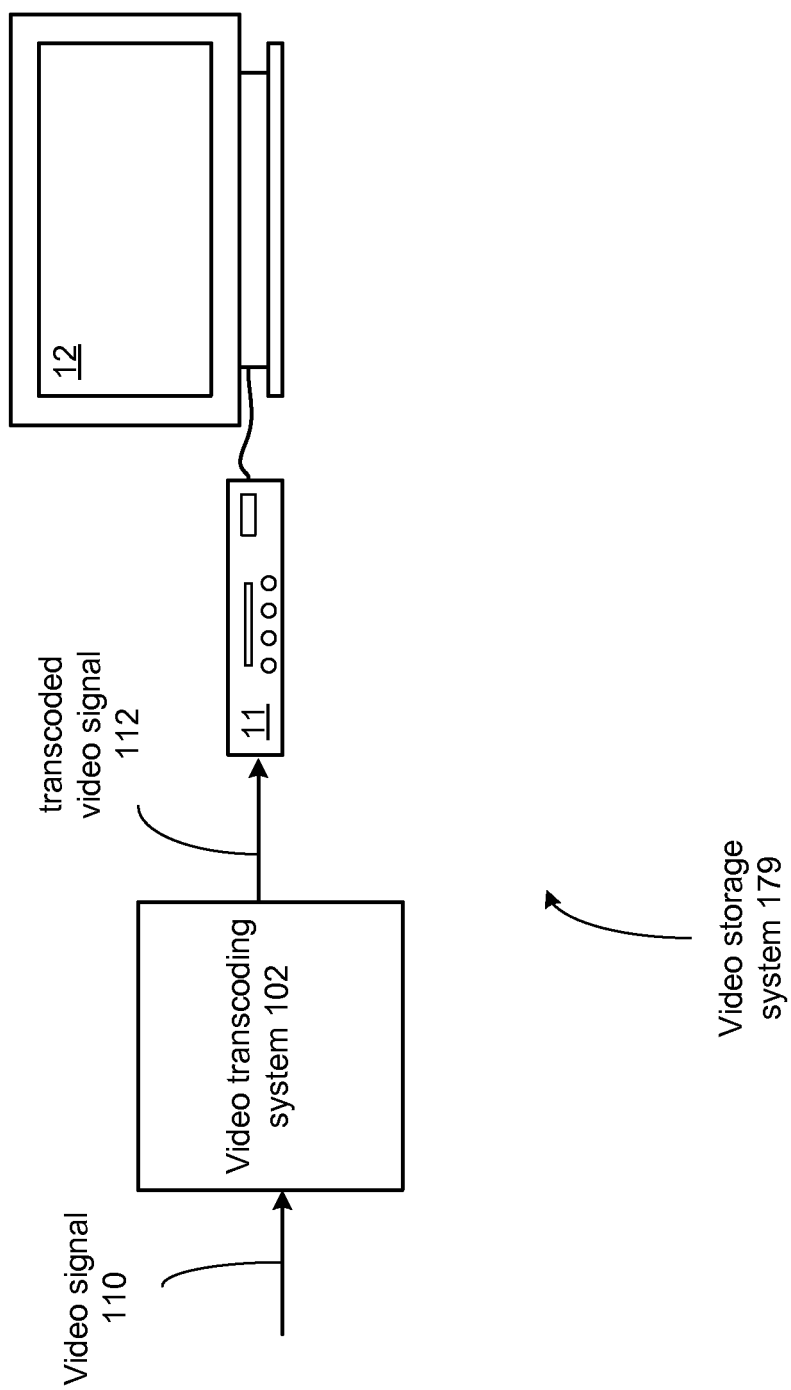
FIG. 4 presents a block diagram representation of a video storage system 179 in accordance with an embodiment of the present invention.

FIG. 4 presents a block diagram representation of a video distribution system 175 in accordance with an embodiment of the present invention. In particular, transcoded video signal 112 is transmitted via a transmission path 122 to a video decoder 104. Video decoder 104, in turn can operate to decode the transcoded video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 5:
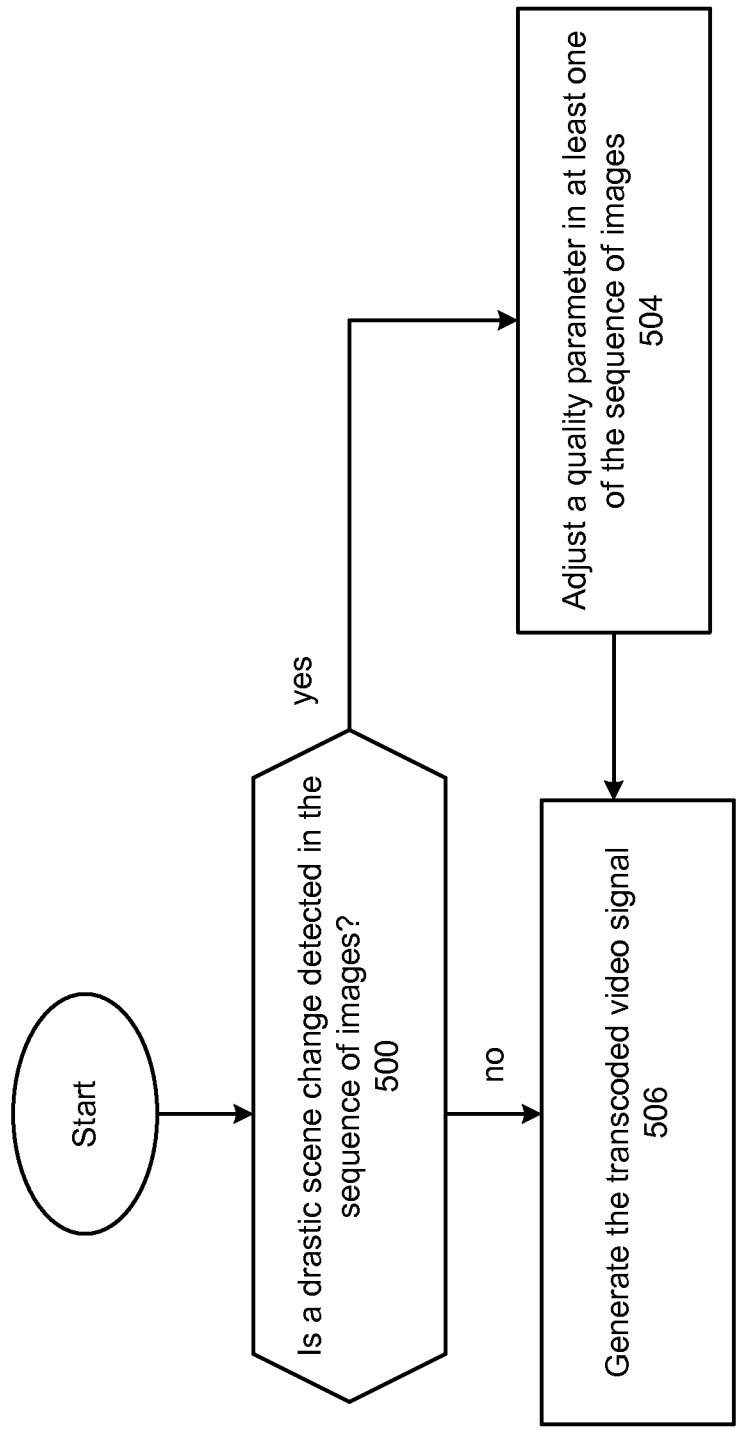
FIG. 5 presents a flowchart representation of a method in accordance with an embodiment of the present invention.

FIG. 5 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the transcoded video signal 112 for display on video display device such as television 12. While video transcoder 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the combined video stream 220 in accordance with the methods and systems described in conjunction with the features and functions of the present invention as described herein.

FIG. 6 presents a flowchart representation of a method in accordance with an embodiment of the present invention. In particular a method is presented for use in conjunction with one ore more functions and features described in conjunction with FIGS. 1-5. In step 500, the method determines if a drastic scene change is detected in the image. When the drastic scene change is detected, an quality parameter is adjusted as shown in step 504 and a transcoded image is generated as shown in step 506.

In an embodiment of the present invention, step 500 includes generating a complexity based on at least one encoding parameter of video signal. The at least one encoding parameter can include a number of bits used to encode the at least one image, an average variance of a plurality of macroblocks in the at least one image, and/or a quantization step value. Step 500 can further include comparing a change in scene complexity to a scene complexity threshold and detecting the drastic scene when the change in scene complexity compares unfavorably to the scene complexity threshold. In addition, step 500 can include generating the change in scene complexity based on a moving average of scene complexities corresponding to a plurality of images in the sequence of images.

In an embodiment of the present invention, the video signal can be a MPEG-2 signal and the transcoded video signal can be an AVC signal. Step 500 can include detecting the drastic scene change based on only I-type images and P-type images of the sequence of images. When a drastic scene change is detected in a P-type image, step 506 can include converting the P-type image to an I-type image.

In preferred embodiments, the various circuit components are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a video transcoding coding system and a drastic scene change detection module for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A system for transcoding a video signal into a transcoded video signal, the video signal including a sequence of images, the system comprising:
a hardware processing device configured to provide:
a drastic scene change detection module that operates as part of the hardware processing device to detect a drastic scene change in the sequence of images by generating a change in scene complexity based on a moving average of scene complexities corresponding to a plurality of images in the sequence of images, comparing a change in scene complexity to a scene complexity threshold, and detecting the drastic scene change when the change in scene complexity is greater than the scene complexity threshold; and
an transcoder section, coupled to the drastic scene change detection module, that operates as part of the hardware processing device to generate the transcoded video signal in a different compressed video format from a compressed video format of the video signal, wherein, when the drastic scene change is detected, a quality parameter of the different compressed video format is adjusted in at least one of the sequence of images in conjunction with encoding the at least one of the sequence of images in the different compressed video format.

2. The system of claim 1 wherein the drastic scene change detection module generates the scene complexity based on at least one encoding parameter of the video signal.

3. The system of claim 2 wherein the at least one encoding parameter includes a number of bits used to encode at least one image of the sequence of images.

4. The system of claim 2 wherein the at least one encoding parameter includes an average variance of a plurality of macro blocks in at least one image of the sequence of images.

5. The system of claim 2 wherein the at least one encoding parameter includes a quantization step value.

6. The system of claim 1 wherein the drastic scene change detection module detects the drastic scene change based on only I-type images and P-type images of the sequence of images.

7. The system of claim 1 wherein when the drastic scene change detection module detects the drastic scene change in a P-type image of the sequence of images, the transcoder section converts the P-type image to an I-type image.

8. The system of claim 1 wherein the video signal is a MPEG-2 signal and the transcoded video signal is an AVC signal.

9. A method for transcoding a video signal into a transcoded video signal, the video signal including a sequence of images, the method comprising:

detecting a drastic scene change in the sequence of images via a video transcoder by generating a change in scene complexity based on a moving average of scene complexities corresponding to a plurality of images in the sequence of images, comparing a change in scene complexity to a scene complexity threshold, and detecting the drastic scene change when the change in scene complexity is greater than the scene complexity threshold; and generating the transcoded video signal via the video transcoder in a different compressed video format from a compressed video format of the video signal, wherein, when the drastic scene change is detected, a quality parameter of the different compressed video format is adjusted in at least one of the sequence of images in conjunction with encoding the at least one of the sequence of images in the different compressed video format.

10. The method of claim 9 wherein detecting the drastic scene change in the sequence of images includes generating the scene complexity based on the at least one encoding parameter of the video signal.

11. The method of claim 10 wherein the at least one encoding parameter includes a number of bits used to encode at least one image of the sequence of images.

12. The method of claim 10 wherein the at least one encoding parameter includes an average variance of a plurality of macro blocks in at least one image of the sequence of images.

13. The method of claim 10 wherein the at least one encoding parameter includes a quantization step value.

14. The method of claim 9 wherein the detecting the drastic scene change in the sequence of images includes detecting the drastic scene change based on only I-type images and P-type images of the sequence of images.

15. The method of claim 9 wherein the detecting the drastic scene change in the sequence of images includes detecting the drastic scene change in a P-type image of the sequence of images, and wherein generating the transcoded video signal includes converting the P-type image to an I-type image.

16. The method of claim 9 wherein the video signal is a MPEG-2 signal and the transcoded video signal is an AVC signal.

\* \* \* \* \*